(12) United States Patent
Hosoda (10) Patent No.: US 9,910,378 B2
(45) Date of Patent: Mar. 6, 2018

(54) IMAGE FORMING APPARATUS CAPABLE OF SHORTENING TIME REQUIRED FOR START-UP, CONTROL METHOD THEREFOR, AND STORAGE MEDIUM

(71) Applicant: CANON KABUSHIKI KAISHA, Tokyo (JP)

(72) Inventor: Yuichi Hosoda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/059,681

(22) Filed: Oct. 22, 2013

(65) Prior Publication Data

US 2014/0119765 A1 May 1, 2014

(30) Foreign Application Priority Data

Oct. 25, 2012 (JP) ................................. 2012-235583

(51) Int. Cl.
*G03G 15/00* (2006.01)
*G03G 13/22* (2006.01)
(Continued)

(52) U.S. Cl.
CPC ......... *G03G 13/22* (2013.01); *G03G 15/5004* (2013.01); *G06F 3/1221* (2013.01);
(Continued)

(58) Field of Classification Search
CPC .............................. H04N 1/2376; G06F 9/442
(Continued)

(56) References Cited

U.S. PATENT DOCUMENTS 5,923,919 A * 7/1999 Nimura .............. G03G 15/5004
399/17
6,667,816 B1 * 12/2003 Van Buren ......... H04N 1/00384
358/3.13
(Continued)

FOREIGN PATENT DOCUMENTS

CN 101324779 A 12/2008
CN 102665022 A 9/2012
(Continued)

OTHER PUBLICATIONS

Machine translation of Hirono 1997.*
(Continued)

*Primary Examiner* — Sevan A Aydin
(74) *Attorney, Agent, or Firm* — Rossi, Kimms & McDowell LLP (57) ABSTRACT

An image forming apparatus which, to the extent possible, prevents an operation for protecting a printer engine from being uncompleted before power to the printer engine is shut down due to cancellation of a process that should be carried out by the printer engine. When a predetermined time period has elapsed since an instruction to reduce power consumption was detected, power to the printer engine is shut down. When the instruction is detected, a canceling instruction for canceling the process that should be carried out by the printer engine is issued to the printer engine. Responsive to this, a cancellation process for the process is started, and an engine protecting instruction for protecting the printer engine without waiting for completion of the cancellation process is issued to the printer engine. After the operation for protecting the printer engine is carried out, power to the printer engine is shut down.

19 Claims, 9 Drawing Sheets

(51) Int. Cl.
*H04N 1/23* (2006.01)
*H04N 1/29* (2006.01)
*H04N 1/32* (2006.01)
*H04N 1/00* (2006.01)
*G06F 3/12* (2006.01)

(52) U.S. Cl.
CPC ....... *G06F 3/1229* (2013.01); *H04N 1/00896* (2013.01); *H04N 1/00928* (2013.01); *H04N 1/2338* (2013.01); *H04N 1/2346* (2013.01); *H04N 1/2376* (2013.01); *H04N 1/295* (2013.01); *H04N 1/32363* (2013.01); *G06F 3/1215* (2013.01); *H04N 1/00891* (2013.01); *H04N 1/00904* (2013.01); *H04N 2201/3288* (2013.01); *H04N 2201/3295* (2013.01); *Y02B 60/1271* (2013.01)

(58) Field of Classification Search
USPC .......................................................... 399/75
See application file for complete search history.

(56) References Cited

U.S. PATENT DOCUMENTS

| | | | |
|---|---|---|---|
| 8,577,241 B2 | 11/2013 | Uehara | |
| 2002/0021453 A1 | 2/2002 | Sakamoto et al. | |
| 2002/0136563 A1* | 9/2002 | Maeda | H04N 1/00352 399/81 |
| 2004/0208667 A1* | 10/2004 | Nakaya | G03G 15/80 399/88 |
| 2005/0196183 A1* | 9/2005 | Taguchi | G03G 15/08 399/12 |
| 2008/0165377 A1 | 7/2008 | Ishii | |
| 2008/0304847 A1 | 12/2008 | Hirano | |
| 2009/0060558 A1 | 3/2009 | Uehara | |
| 2009/0122345 A1 | 5/2009 | Tanaka | |
| 2010/0213771 A1 | 8/2010 | Tsuganezawa | |
| 2011/0037999 A1 | 2/2011 | Sano | |
| 2012/0159212 A1 | 6/2012 | Takatani et al. | |
| 2012/0219313 A1* | 8/2012 | Zensai | G03G 15/1605 399/75 |

FOREIGN PATENT DOCUMENTS

| | | | | |
|---|---|---|---|---|
| JP | 09-034578 A | | 2/1997 | |
| JP | 09258574 A | * | 10/1997 | ............ G03G 15/16 |
| JP | 11-095516 A | | 4/1999 | |
| JP | 2000-082014 A | | 3/2000 | |
| JP | 2001265174 A | | 9/2001 | |
| JP | 2004-077692 A | | 3/2004 | |
| JP | 2006142551 A | * | 6/2006 | |
| JP | 2008158194 A | * | 7/2008 | |
| JP | 2009058664 A | | 3/2009 | |
| JP | 2009113451 A | * | 5/2009 | |
| JP | 2010190982 A | * | 9/2010 | |
| JP | 2012118222 A | * | 6/2012 | |

OTHER PUBLICATIONS

Machine translation of Sumiya 2010.*
Machine translation of Ri, JP 2012-118222 (2012).*
Extended European Search Report for EP 13005044.6, mail date Feb. 26, 2014.
Office Action issued in Chinese Appln. No. 201310508359.5, mailed Mar. 1, 2016. English translation provided.

* cited by examiner

POWER-ON STATE

☐ ENERGIZED STATE
▨ DE-ENERGIZED STATE

FIG.5B

POWER-OFF STATE

FIG.5C

POWER-SAVING STATE

FIG.5D

HIGH-SPEED START-UP STANDBY STATE

IMAGE FORMING APPARATUS CAPABLE OF SHORTENING TIME REQUIRED FOR START-UP, CONTROL METHOD THEREFOR, AND STORAGE MEDIUM

BACKGROUND OF THE INVENTION

Field of the Invention

The present invention relates to an image forming apparatus, a control method therefor, and a computer-readable storage medium storing a program for implementing the control method.

Description of the Related Art

In recent years, the time required to start an image forming apparatus has continued to increase. One of the causes is that the amount of data which should be expanded from ROM to RAM at start-up has been increasing with increase in functions of an image forming apparatus.

Accordingly, there has been a technique that, when a user turns off a power-supply switch, holds data as it is in RAM, and when the user turns on the power-supply switch the next time, skips expansion of data from ROM to RAM so as to shorten the time required for start-up.

Examples of this technique include a technique called suspend, which holds data in RAM by continuing to pass electric current through the RAM (see, for example, Japanese Laid-Open Patent Publication (Kokai) No. H09-34578).

There has also been a technique called hibernation, which holds data in RAM by temporarily saving data in RAM to an HDD (see, for example, Japanese Laid-Open Patent Publication (Kokai) No. 2000-82014).

According to these techniques, the time required for start-up can be shortened while it appears to a user that power to an image forming apparatus appears is off.

Further, recent image forming apparatuses provide power-supply control using software in response to user operation of a power-supply switch.

Conventionally, power is electrically turned off in response to operation of a power-supply switch, and hence in an image forming apparatus having a separation mechanism for a developing device and a photosensitive drum, the developing device and the photosensitive drum may be attached to each other when power is off (see, for example, Japanese Laid-Open Patent Publication (Kokai) No. 2004-77692).

Accordingly, control is provided such that when power is to be turned on, the developing device attached to the photosensitive drum is separated from the photosensitive drum so as to check positions of the developing device and the photosensitive drum, and then the developing device is attached again to the photosensitive drum.

Thus, in an image forming apparatus that provides power-supply control using software in response to operation of a power-supply switch, a developing device and a photosensitive drum are separated from each other when power is to be turned off, so that a separation process can be skipped when power is turned on later, and the time required for start-up can be shortened.

In an image forming apparatus that provides power-supply control using software in response to operation of a power-supply switch, a measure is taken against a situation where software falls into an unexpected state due to a bug or the like (such as a state of being unable to leave a specific process). Specifically, the image forming apparatus has a timer power-off function of turning off power to at least a printer engine among hardware mechanisms when a predetermined time period has elapsed since a power-off operation was detected. This function ensures power-off in response to a power-off operation.

In a case where an image forming apparatus is configured to continue passing electric current through RAM even if a power-off operation is performed in order to shorten the time required for start-up of the image forming apparatus, it should appear to a user that power to the image forming apparatus is off even when electric current is being passed through RAM. In this case, the image forming apparatus lies in a high-speed start-up standby state in which power to at least a printer engine is turned off, and units in a controller other than RAM are placed in a power-saving state to the extent possible.

When a power-on operation is performed in this high-speed start-up standby state, it should appear to the user that this is the same as normal power-on. Accordingly, even when there is a print job prior to the high-speed start-up standby state, it is necessary to delete the print job and complete a start-up process with no print job present.

Aimed high-speed start-up cannot be realized by deleting, during a start-up process, a print job input prior to the high-speed start-up standby state, and hence in general, a print job is deleted before shifting into the high-speed start-up standby state.

A problem explained hereafter, however, will arise when an image forming apparatus is configured to exert the timer power-off function even when shifting into the high-speed start-up standup state while deleting a print job in accordance with a power-off operation. For example, as shown in FIG. 9, there may be cases where due to time-consuming deletion of a print job, a time-out occurs with some processing incomplete, and power to a printer engine is turned off, resulting in an engine protection command being too late.

In the case of a printer engine having a separation mechanism, it is necessary to, at the time of shifting into the high-speed start-up standby state, carry out a separation process before turning off power to the printer engine, but there may be cases where the separation process cannot be carried out due to the effect of a print job deletion process.

Figure 9:
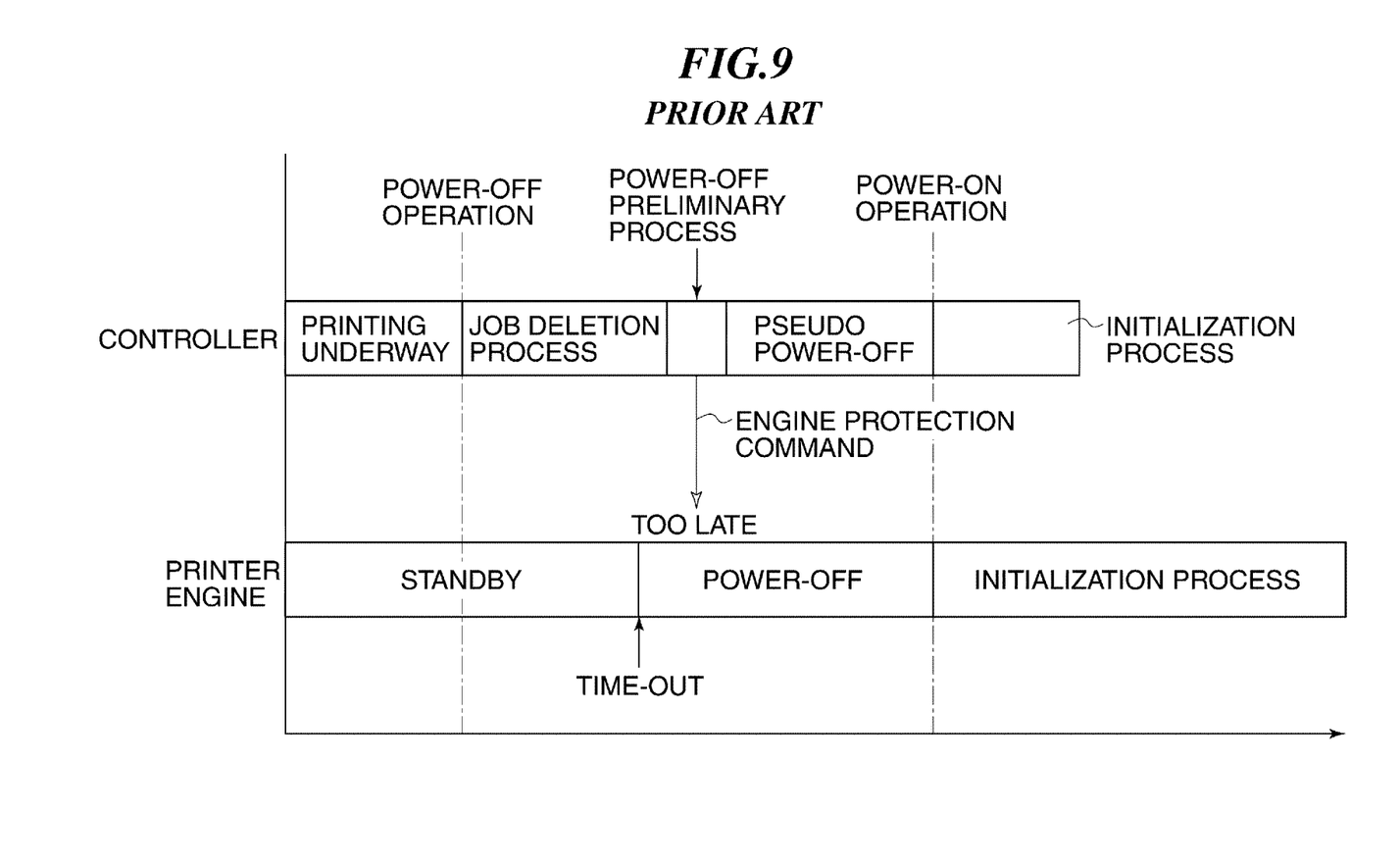
FIG. 9 is a diagram showing a timing chart of an example in which a time-out occurs before an engine protection process according to a prior art.

As a result, at the time of returning from this high-speed start-up standby state due to a power-on operation later, a separation process that is actually unneeded is carried out as a start-up process for a printer engine, and as shown in FIG. 9, an initialization process requires long time, slowing start-up.

On the other hand, when a set time for the timer power-off function is relatively long, the original purpose of taking a measure against a situation where software falls into an unexpected state due to a bug or the like cannot be accomplished.

SUMMARY OF THE INVENTION

The present invention provides an image forming apparatus and a control method therefor, which, to the extent possible, prevent operation for protecting a printer engine from being uncompleted before power to the printer engine is shut down due to cancellation of a process that should be carried out by the printer engine, as well as a computer-readable storage medium storing a program for implementing the control method.

Accordingly, a first aspect of the present invention provides an image forming apparatus comprising a printer engine, a controller configured to control the printer engine, a first shutdown unit configured to shut down power to the printer engine when a time period determined in advance has elapsed since an instruction to reduce power consumption was detected, an issuing unit configured to, upon detecting the instruction to reduce power consumption, issue, to the printer engine, a canceling instruction for canceling a process that should be carried out by the printer engine, a control unit configured to, in accordance with the cancelling instruction issued by the issuing unit, start a cancellation process for the process that should be carried out by the printer engine, and issue an engine protecting instruction for causing the printer engine to perform an operation for protecting the printer engine without waiting for completion of the cancellation process, and a second shutdown unit configured to shut down power to the printer engine after the operation for protecting the printer engine is carried out in accordance with the engine protecting instruction issued by the control unit.

Accordingly, a second aspect of the present invention provides a control method for an image forming apparatus having a printer engine and a controller that controls the printer engine, comprising a first shutdown step of shutting down power to the printer engine when a time period determined in advance has elapsed since an instruction to reduce power consumption was detected, an issuing step of, upon detecting the instruction to reduce power consumption, issuing, to the printer engine, a canceling instruction for canceling a process that should be carried out by the printer engine, a control step of, in accordance with the cancelling instruction issued in the issuing step, starting a cancellation process for the process that should be carried out by the printer engine, and issuing an engine protecting instruction for causing the printer engine to perform an operation for protecting the printer engine without waiting for completion of the cancellation process, and a second shutdown step of shutting down power to the printer engine after the operation for protecting the printer engine is carried out in accordance with the engine protecting instruction issued in the control step.

Accordingly, a third aspect of the present invention provides a non-transitory computer-readable storage medium storing a program for causing a computer to execute a control method for an image forming apparatus having a printer engine and a controller that controls the printer engine, the control method comprising a first shutdown step of shutting down power to the printer engine when a time period determined in advance has elapsed since an instruction to reduce power consumption was detected, an issuing step of, upon detecting the instruction to reduce power consumption, issuing, to the printer engine, a canceling instruction for canceling a process that should be carried out by the printer engine, a control step of, in accordance with the cancelling instruction issued in the issuing step, starting a cancellation process for the process that should be carried out by the printer engine, and issuing an engine protecting instruction for causing the printer engine to perform an operation for protecting the printer engine without waiting for completion of the cancellation process, and a second shutdown step of shutting down power to the printer engine after the operation for protecting the printer engine is carried out in accordance with the engine protecting instruction issued in the control step.

According to the present invention, operation for protecting the printer engine can be prevented from being uncompleted to the extent possible before power to the printer engine is shut down due to cancellation of a process that should be carried out by the printer engine.

Further features of the present invention will become apparent from the following description of exemplary embodiments (with reference to the attached drawings).

BRIEF DESCRIPTION OF THE DRAWINGS

FIGS. 5A to 5D are diagrams showing power-supply states (power modes) according to the present embodiment, in which FIG. 5A shows a power-on state, FIG. 5B shows a power-off state.

DESCRIPTION OF THE EMBODIMENTS

The present invention will now be described in detail with reference to the drawings showing an embodiment thereof.

Figure 1:
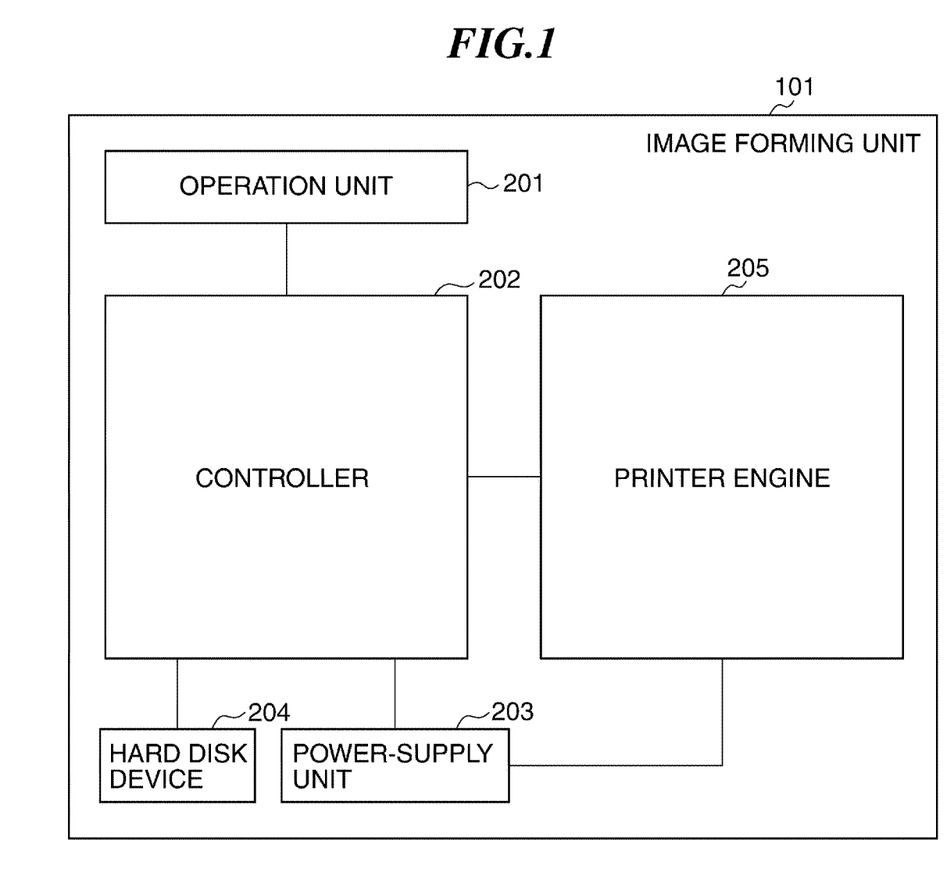
FIG. 1 is a diagram schematically showing an arrangement of an image forming apparatus according to an embodiment of the present invention.

FIG. 1 is a diagram schematically showing an arrangement of an image forming apparatus 101 according to an embodiment of the present invention.

Referring to FIG. 1, the image forming apparatus 101 is comprised of a controller 202, a printer engine 205, an operation unit 201, a hard disk device 204, and a power-supply unit 203.

The controller 202 controls the image forming apparatus 101 by issuing instructions to modules. The printer engine 205, which is controlled by the controller 202, forms an image represented by image data on a sheet according to image information shared by the controller 202. In the following description, forming an image on a sheet will be refereed to merely as printing.

The operation unit 201 performs operation on the image forming apparatus 101. The operation unit 201 has operation buttons for a user to configure the image forming apparatus 101, and a display panel such as a liquid crystal screen which is a display unit that shows the user a variety of information on the image forming apparatus 101.

The hard disk device 204 may be another storage device such as an SSD, and image data, resource information for use in generating image data, and so on are stored in the hard disk device 204.

The power-supply unit 203, which is connected to an AC power supply, supplies electrical power to units of the image forming apparatus 101.

Thus, the image forming apparatus 101 according to the present embodiment has the printer engine 205, and the controller 202 which controls the printer engine 205. When a time period determined in advance has elapsed since an instruction to reduce power consumption was detected, the image forming apparatus 101 forcefully shuts down power to the printer engine 205. In the following description, shutting down power is expressed by "turning off power".

Figure 2:
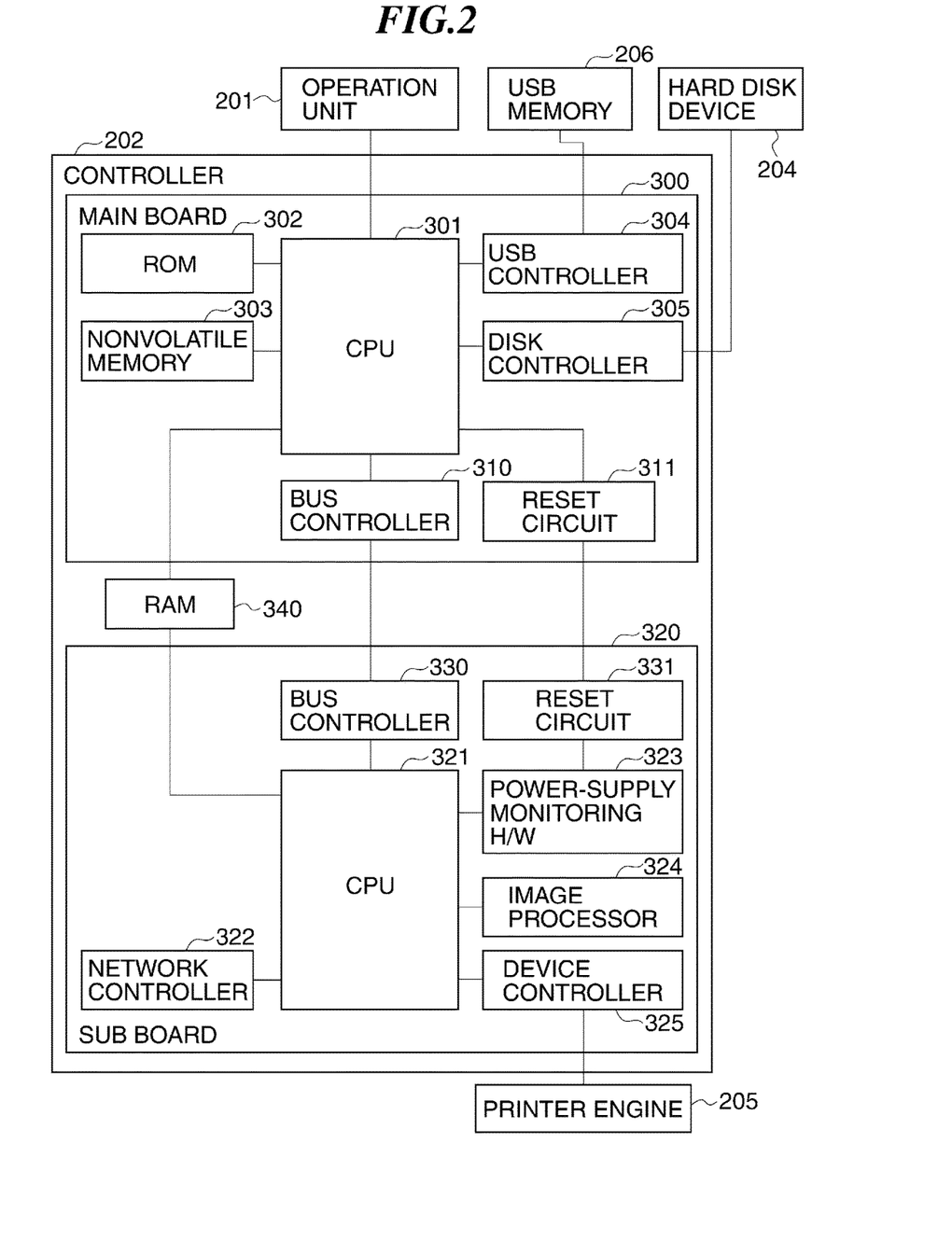
FIG. 2 is a diagram schematically showing an arrangement of a controller appearing in FIG. 1.

FIG. 2 is a diagram schematically showing an arrangement of the controller 202 appearing in FIG. 1.

Referring to FIG. 2, the controller 202 is comprised of a main board 300, a sub board 320, and a RAM 340.

The main board 300 and the sub board 320 have a CPU 301 and a CPU 321, respectively, but a chip set, a bus bridge, a clock generator, and so on which are CPU peripheral hardware are not shown in the figure.

The main board 300 is a universal CPU system. The CPU 301 controls the entire main board 300. Programs to be executed by the CPU 301 and the CPU 321 are stored in the ROM 302.

Setting information on the image forming apparatus 101, counter information relating to printing, and so on are stored in a nonvolatile memory 303, and even when power to the image forming apparatus 101 is turned off, the stored information can be held. A USB controller 304 controls input and output of data to and from the USB memory 206. A variety of data to be used by the image forming apparatus 101 is stored in the USB memory 206.

A disk controller 305 controls input and output to and from the hard disk device 204. A bus controller 310 has a function of bridging with a bus controller 330 of the sub board 320. A reset circuit 311 resets H/W settings of the main board 300.

The sub board 320 is comprised of a relatively small universal CPU system and image processing hardware. The CPU 321 controls the entire sub board 320. The network controller 322 is a controller for connecting to a network.

A power-supply monitoring H/W 323 monitors power-supply control for the image forming apparatus 101. When the CPU 321 is normally operating, the power-supply monitoring H/W 323 can reset the image forming apparatus 101 via the reset circuits 331 and 311 in accordance with an instruction from the CPU 321. When power to the image forming apparatus 101 is off, the power-supply monitoring H/W 323 can supply power to the controller 202 in response to input of a power-supply switch, not shown.

The reset circuits 331 resets H/W settings of the sub board 320. An image processor 324 carries out real-time digital image processing. A device controller 325 controls the printer engine 205. The bus controller 330 has a function of bridging with the bus controller 310 of the main board 300.

The RAM 340 is accessible from each of the CPU 301 and the CPU 321 and is used as main storage memory for each of them. In accordance with an initial program stored in the ROM 302, the CPU 301 reads main programs for the CPU 301 and the CPU 321, respectively, from the ROM 302 and stores them in the RAM 340.

Figure 3:
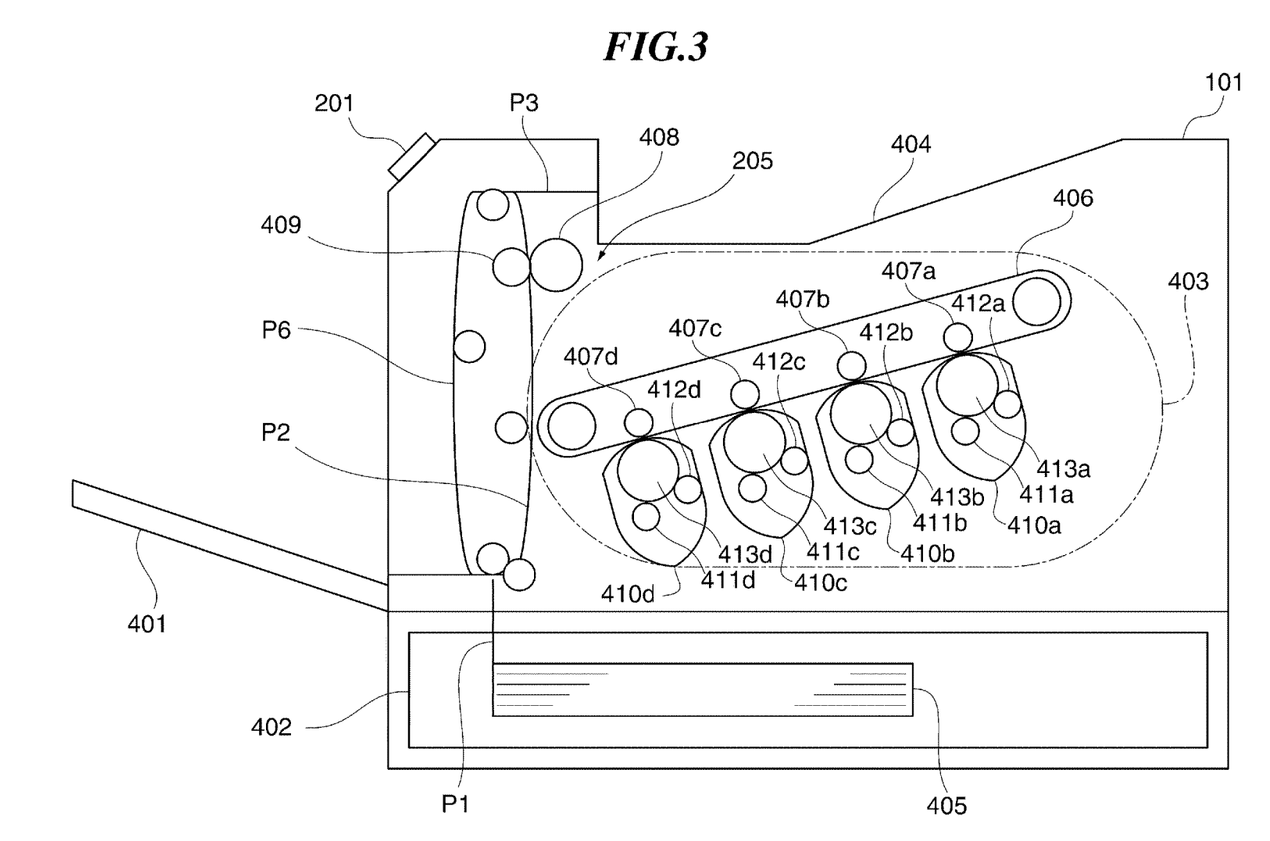
FIG. 3 is a diagram schematically showing an arrangement of a printer engine appearing in FIG. 1.

FIG. 3 is a diagram schematically showing an arrangement of the printer engine 205 appearing in FIG. 1.

It should be noted that in FIG. 3, the printer engine 205 is shown with the image forming apparatus 101.

Referring to FIG. 3, the image forming apparatus 101 is comprised of sheet feeding trays 401 and 402, a discharged sheet tray 404, an image forming unit 403 that carries out image formation by an electrophotographic process, a fixing roller (fixing unit) 408, and a pressurization roller (pressurization unit) 409.

When a sheet is fed from the sheet feeding cassette 402, a sheet 405 is conveyed to conveying paths P1, P2, and P3 in this order in the case of one-sided printing. In the case of double-sided printing, the sheet 405 is conveyed to conveying paths P1, P2, and P3 in this order and then switched back to be conveyed to conveying paths P6, P2, and P3 in this order and discharged.

A description will now be given of the image forming unit 403 that carries out image formation. Toner cartridges 410a, 410b, 410c, and 410d, charging rollers 411a, 411b, 411c, and 411d, developing rollers 412a, 412b, 412c, and 412d are configured for yellow, magenta, cyan, and black, respectively.

For example, the toner cartridge 410a is comprised of a charger including the charging roller 411a, a developing device including the developing roller 412a, and a photosensitive drum 413a. The charger is a unit for forming an electrostatic latent image on the photosensitive drum 413a according to image data sent from the controller 202, and the developing device is a unit for putting toner on the photosensitive drum 413a with an electrostatic latent image formed thereon and developing the same.

Thus, the printer engine 205 has the photosensitive drums 413a to 413d, and the charging rollers 411a to 411d that charge the photosensitive drums 413a to 413d with electricity. The printer engine 205 also has the developing rollers 412a to 412d that develop electrostatic latent images formed on the photosensitive drums 413a to 413d, and an intermediate transfer belt 406 onto which toner images developed by the developing rollers 412a to 412d are transferred. Further, the printer engine 205 has the fixing roller 408 that fixes toner images, which have been transferred onto the intermediate transfer belt 406, on a sheet.

A description will now be given of control provided by the printer engine 205 during one-sided printing. In accordance with an instruction from the controller 202, electrostatic latent images are formed on the photosensitive drums 413a, 413b, 413c, and 413d in this order according to image data sent from the controller 202, and the electrostatic latent images are developed by the developing rollers 412a to 412d. The developed toner images are successively transferred onto the intermediate transfer belt 406.

At the same time, the printer engine 205 feeds the sheet 405 from the sheet feeding cassette 402 and secondarily transfers the toner images, which have been primarily transferred onto the intermediate transfer belt 406, onto the sheet being conveyed to the conveying path P2 by way of the conveying path P1.

The printer engine 205 conveys the sheet 405, onto which the toner images have been transferred on the conveying path P2, to a fixing device comprised of the fixing roller 408 and the pressurization roller 409 so as to fix the toner image on the sheet 405. Finally, the printer engine 205 discharges the sheet 405, on which the toner images have been fixed, by way of the conveying path P3.

A description will now be given of a separating operation. There is a separation mechanism at the following positions: between the photosensitive drums 413a to 413d and the intermediate belt 406, between the developing rollers 412a to 412d and the photosensitive drums 413a to 413d, between the charging rollers 411a to 411d and the photosensitive drums 413a to 413d, and the fixing roller 408 and the pressurization roller 409. The separation mechanisms have only to be those which draw apart units, which are desired to be separated, from each other and reduce the distance therebetween using motors or solenoids. For example, the separation mechanisms have only to be those which draw apart axes of respective units, which are desired to be separated from each other, from each other and reduce the distance therebetween using motors or solenoids. Also, well-known techniques may be used.

The printer engine 205 has the yellow, magenta, and cyan photosensitive drums 413a to 413c and the charging rollers 411a to 411c attached to the respective photosensitive drums 413a to 413c in order to reduce wear of the photosensitive drums other than the black photosensitive drums 413d at the time of monochrome printing using only black toner. At this time, the printer engine 205 drives the separation mechanisms between the photosensitive drums 413a to 413d and the developing rollers 412a to 412c and between the photosensitive drums 413a to 413d and the intermediate transfer belt 406, thus bringing them from an attached state to a separated state.

When power to the image forming apparatus 101 is off or in a power-saving mode in which power to the printer engine 205 is off, the printer engine 205 drives the separation mechanisms for the units in accordance with an instruction from the controller 202. Specifically, the printer engine 205 drives the separation mechanisms between the photosensitive drums 413a to 413d and the intermediate transfer belt 406 attached to them, and the separation mechanism between the fixing roller 408 and the pressurization roller 409. The printer engine 205 also drives the separation mechanisms between the photosensitive drums 413a to 413d and the charging rollers 411a to 411d attached to them and between the photosensitive drums 413a to 413d and the developing rollers 412a to 412d attached to them. As a result, the units are brought from the attached state to the separated state.

On the other hand, when power to the image forming apparatus 101 is on, the printer engine 205 carries out a start-up process and additionally drives the separation mechanisms described above to bring the units from the separated state to the attached state and prepares for a printing instruction from the controller 202.

The separation process described above corresponds to a process determined in advance. Namely, the process determined in advance is a process in which the charging rollers 411a to 411d, the developing rollers 412a to 412d, and the intermediate transfer belt 406 are relatively separated from the photosensitive drums 413a to 413d. The process determined in advance is also a process in which the fixing roller 408 is relatively separated from the pressurization roller 409. Here, the relatively separating process means a process in which the photosensitive drums 413a to 413d and the charging rollers 411a to 411d are separated from each other by moving at least either of them, for example.

Moreover, as described above, the separation process is a process different from the start-up process carried out by the printer engine 205 when power is supplied to the printer engine 205 again. The separation process needs to be carried out in addition to the start-up process when power is turned off without carrying out the separation process and power is supplied to the printer engine 205 again.

Figure 4:
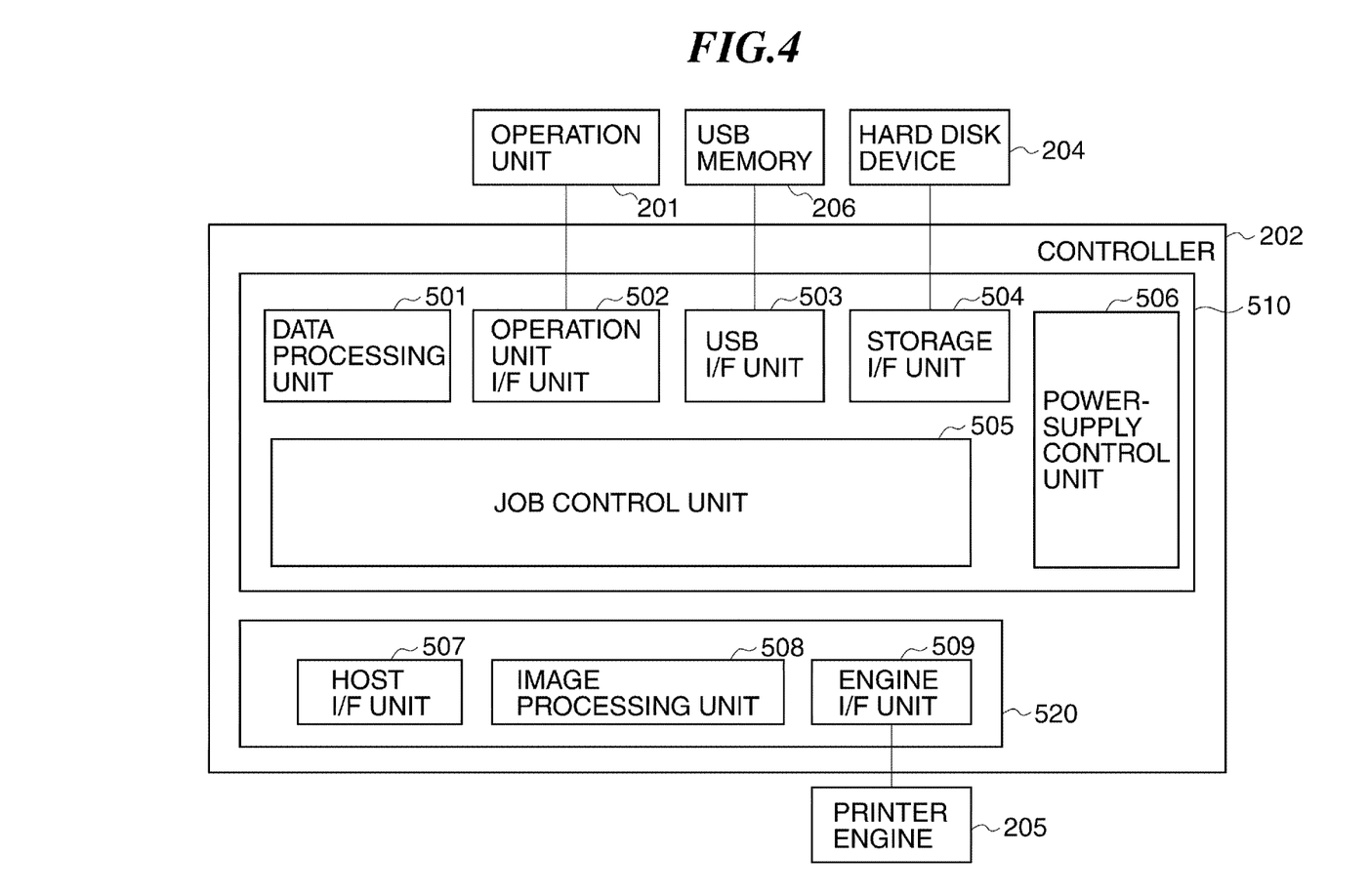
FIG. 4 is a diagram showing a software arrangement of the controller appearing in FIG. 1.

FIG. 4 is a diagram showing a software arrangement of the controller 202 appearing in FIG. 1.

Referring to FIG. 4, the controller 202 is comprised of a block 510, which is executed by the CPU 301, and a block 520, which is executed by the CPU 321.

The block 510 is comprised of a data processing unit 501, an operation unit interface unit 502, a USB interface unit 503, a storage interface unit 504, a job control unit 505, and a power-supply control unit 506.

The block 520 is comprised of a host interface unit 507, an image processing unit 508, and an engine interface unit 509.

The host interface unit 507 receives print data sent from another apparatus and stores the same in the RAM 340. The data processing unit 501 reads the print data, which is stored by the host interface unit 507, from the RAM 340, interprets the read print data and registers the same as a job in the job control unit 505, and also converts the print data into intermediate data and stores the intermediate data in the RAM 340.

The image processing unit 508 reads the intermediate data, which is stored by the data processing unit 501, from the RAM 340, generates bitmap data from the intermediate data via the image processor 324, and stores the bitmap data in the RAM 340.

After the image processing unit 508 generates the bitmap data, the engine interface unit 509 instructs the printer engine 205 to perform printing. The engine interface unit 509 monitors the state of the printer engine 205 and notifies another apparatus of the state of the printer engine 205 via the host interface unit 507 as the need arises.

At the time of printing, the engine interface unit 509 issues a print request command to the printer engine 205 and notifies the image processor 324 of a position of the bitmap data stored in the RAM 340.

Thereafter, the engine interface unit 509 transfers the bitmap data, which is stored in the RAM 340, to the printer engine 205 via the image processor 324 and the device controller 325 in accordance with an image transfer synchronization signal from the printer engine 205.

The operation unit interface unit 502 prompts the user to configure the image forming apparatus 101 via the operation unit 201 and displays information on the image forming apparatus 101.

The USB interface unit 503 reads an image file stored in the USB memory 206, and in response to a direct printing instruction from the user via the operation unit interface unit 502, registers the same as a direct print job in the job control unit 505.

When, for example, a job received via the host interface unit 507 is a storage job as a result of data interpretation by the data processing unit 501, the storage interface unit 504 stores the data in the hard disk device 204.

Also, in response to an instruction to print the storage job from the user via the operation unit 201, the storage interface unit 504 reads the data stored in the hard disk device 204.

In response to requests for job registration, deletion, interruption, resumption, and so on from software modules, the job control unit 505 issues operating instructions to concerned software modules according to jobs.

The power-supply control unit 506 is a software module that provides control to switch into various power-supply states according to power-supply switch operation and power-saving settings.

A description will now be given of functions performed by the arrangement of the image forming apparatus 101 described above. First, a description will be given of a printing function.

The CPU 321 receives print data provided in a page-description language from another apparatus and stores the same in the RAM 340. Upon checking that the CPU 321 has received the print data, the CPU 301 analyzes the page-description language, and the image processor 324 generates intermediate data convertible into bitmap data and stores the intermediate data in the RAM 340.

Upon checking that the intermediate data has been generated, the CPU 321 reads the intermediate data from the RAM 340, and inputs the intermediate data to the image processor 324. The image processor 324 converts the read intermediate data into bitmap data and outputs the bitmap data to the RAM 340 via the CPU 321.

In response to the generation of the bitmap data, the CPU 321 sends a print request to the printer engine 205 via the device controller 325 and notifies the image processor 324 of a position of the image data (bitmap data) stored in the RAM 340.

The CPU 321 sends the image data stored in the RAM 340 to the printer engine 205 via the image processor 324 and the device controller 325 in accordance with an image transfer synchronization signal from the printer engine 205.

The printer engine 205 prints an image, which is represented by the digital image data transferred from the controller 202, on a sheet by an electrophotographic process.

Next, a description will be given of a start-up time shortening function. The start-up time shortening function is a function of holding the RAM 340 of the controller 202 in an energized state to maintain memory contents in the RAM 340 at power-off, and at the time of next power-on, bringing the image forming apparatus 101 into a state of being operable by the user in a short time.

Next, a description will be given of a sleep function. The sleep function is a function of bringing the image forming apparatus 101 into a power-saving state so as to reduce power consumption by the image forming apparatus 101 when a job has not been executed for a predetermined time period or longer. This predetermined time period may be either a default value or set by the user.

Next, a description will be given of a login function. The login function is a function of receiving user IDs and passwords corresponding to individual users via the operation unit 201, and receiving input of various jobs only when personal authentication is successful. Security is improved by recording histories of executed jobs for respective users.

The image forming apparatus 101 can selectively enable and disable each of these additional functions by settings. A display panel of the operation unit 201 is able to display various setting screens, and users can selectively enable and disable the additional functions via the setting screens.

The image forming apparatus 101 also has a function of displaying a normal screen, a login screen, a user mode screen, and a service mode screen on the display panel of the operation unit 201. These screens are configured to be switched as the need arises when the user performs predetermined operations.

The normal screen is displayed on the operation unit 201 under normal conditions, and when this screen is being displayed, the image forming apparatus 101 receives instructions to execute various jobs via operation buttons provided on the operation unit 201. Upon receiving user's predetermined operations, the image forming apparatus 101 switches the display to the user mode screen.

The login screen is displayed when the login function is enabled. When this screen is being displayed, the image forming apparatus 101 receives input of a user ID and a password via the operation buttons on the operation unit 201. When the user ID and the password input by the user is valid, the display of the operation unit 201 is switched to the normal screen.

The user mode screen is a setting screen which allows a general user to change setting items except for special setting items intended for service persons. For ordinary image forming apparatuses, this is called merely a setting screen in many cases, but here, this is referred to as the user mode screen so as to clearly distinguish from the service mode screen in terms of explanation. On the user mode screen, the start-up time shortening function and the login function can be enabled and disabled.

The service mode screen allows a service person to adjust the motion of the image forming apparatus 101 and change special setting items.

Figure 5A:
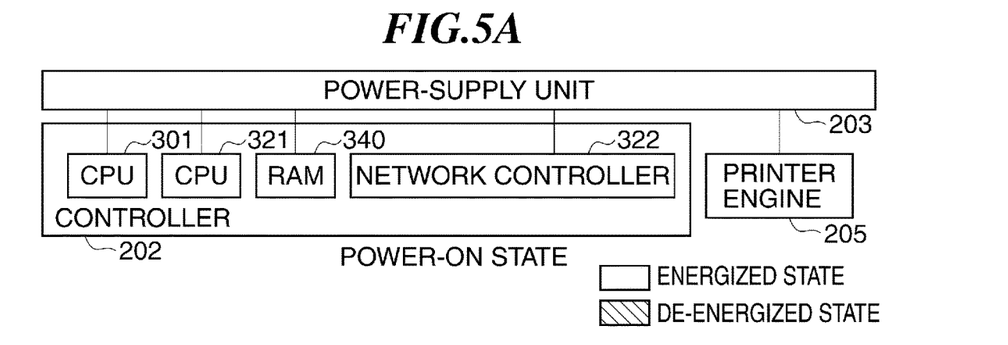
Figure 5B:
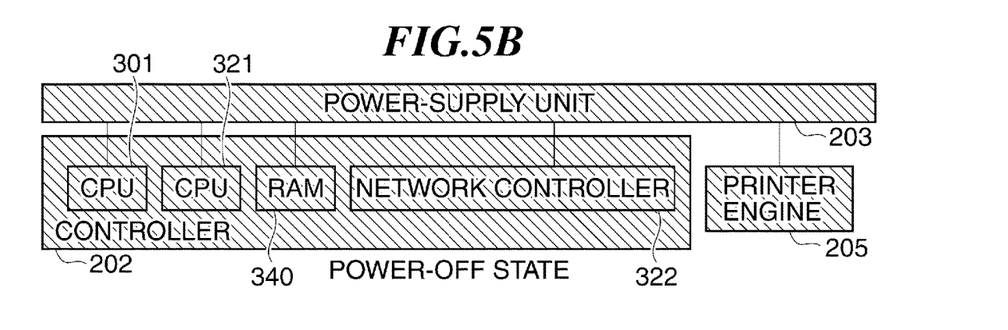
Figure 5C:
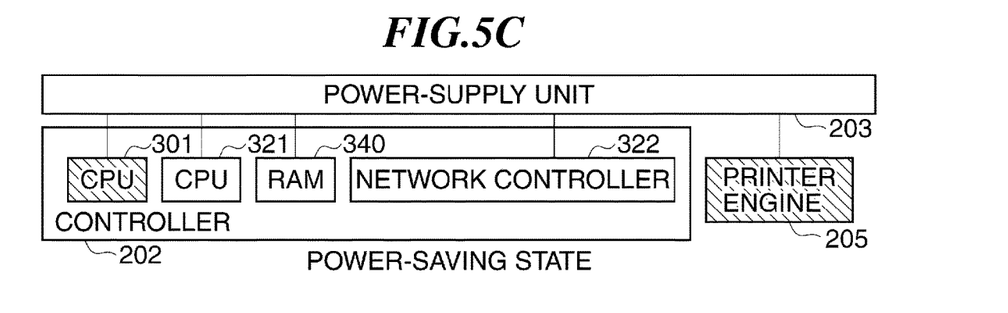
FIG. 5C shows a power-saving state.
Figure 5D:
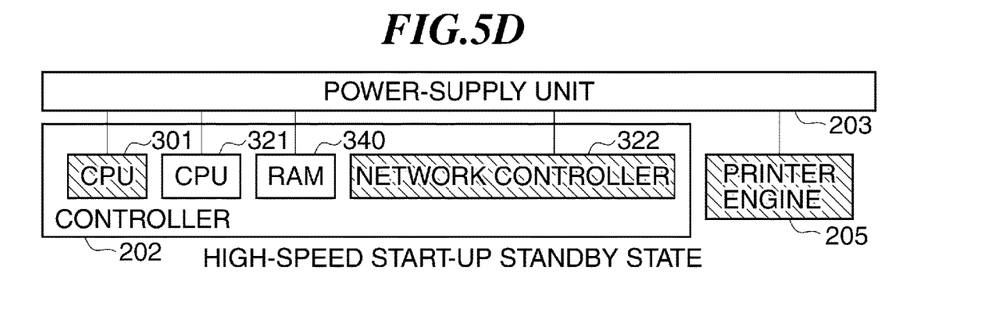
FIG. 5D shows a high-speed start-up standby state.

FIGS. 5A to 5D are diagrams showing power-supply states (power modes) according to the present embodiment, in which FIG. 5A shows a power-on state, FIG. 5B shows a power-off state, FIG. 5C shows a power-saving state, and FIG. 5D shows a high-speed start-up standby state.

It should be noted that in the following description, stop of power supply includes not only a case where supplied power becomes zero, but also a case where a very small amount of power is supplied to such an extent that a power-supply destination does not normally operate.

In the power-on state shown in FIG. 5A, power is supplied to components of the image forming apparatus 101. When a predetermined time period has elapsed with no functions performed in the power-on state, the image forming apparatus 101 shifts into the power-saving state shown in FIG. 5C.

When a power-off operation is performed using a power-supply button in the power-on state, the image forming apparatus 101 shifts into the power-off state shown in FIG. 5B under a predetermined condition. The condition on which the image forming apparatus 101 switches into the power-off state shown in FIG. 5B may be a pressing and holding operation in which the power-supply button is depressed for a predetermined time period or longer.

When a power-off operation is performed using the power-supply button in the power-on state, the image forming apparatus 101 shifts into the high-speed start-up standby state shown in FIG. 5D under a predetermined condition.

In the power-off state shown in FIG. 5B, power supply to the components of the image forming apparatus 101 is stopped. In the power-off state, when power is turned on using the power-supply button, the image forming apparatus 101 shifts into the power-on state shown in FIG. 5A. At this time, main programs for the CPU 301 and the CPU 321 are read from the ROM 302 and stored in the RAM 340, and therefore, it takes longer time to complete start-up as compared to start-up from the highs-peed start-up standby state shown in FIG. 5D.

In the power-saving state shown in FIG. 5C, power supply to the CPU 321, the RAM 340, the network controller 322, and the power-supply unit 203 is continued, and power supply to the other components is stopped.

When, in the power-saving state, data is input to the network controller 322 or a power-saving cancellation button of the operation unit 201 is depressed by the user, the image forming apparatus 101 shifts into the power-on state shown in FIG. 5A.

When, in the power-saving state, a power-off operation is performed using the power-supply button, the image forming apparatus 101 shifts into the power-off state shown in FIG. 5B under a predetermined condition. The condition on which the image forming apparatus 101 shifts into the power-off state shown in FIG. 5B may be a pressing and holding operation in which the power-supply button is depressed for a predetermined time period or longer.

When, in the power-saving state, a power-off operation is performed using the power-supply button, the image forming apparatus 101 shifts into the high-speed start-up standby state shown in FIG. 5D under a predetermined condition.

In the high-speed start-up standby state shown in FIG. 5D, power supply to the CPU 321, the RAM 340, and the power-supply unit 203 is continued, and power supply to the other components is stopped.

When, in the high-speed start-up standby state, a power-on operation is performed by depressing the power-supply button, the image forming apparatus 101 shifts into the power-on state shown in FIG. 5A. At this time, the CPU 301 uses the main program already stored in the RAM 340, and hence, it takes shorter time to complete start-up as compared to start-up from the power-off state shown in FIG. 5B. Power consumption is higher than in the power-off state shown in FIG. 5B and lower than in the power-saving state shown in FIG. 5C. It should be noted that when, in the high-speed start-up standby state, a pressing and holding operation in which the power-supply button is depressed for a predetermined time period or longer is performed, the image forming apparatus 101 may shift into the power-off state shown in FIG. 5B.

Amounts of power consumption in the states described above are expressed as follows using inequality signs: FIG. 5A>FIG. 5C>FIG. 5D>FIG. 5B. Shifting into the state shown in FIG. 5A takes place in FIG. 5C, FIG. 5D, and FIG. 5B in this order.

Figure 6:
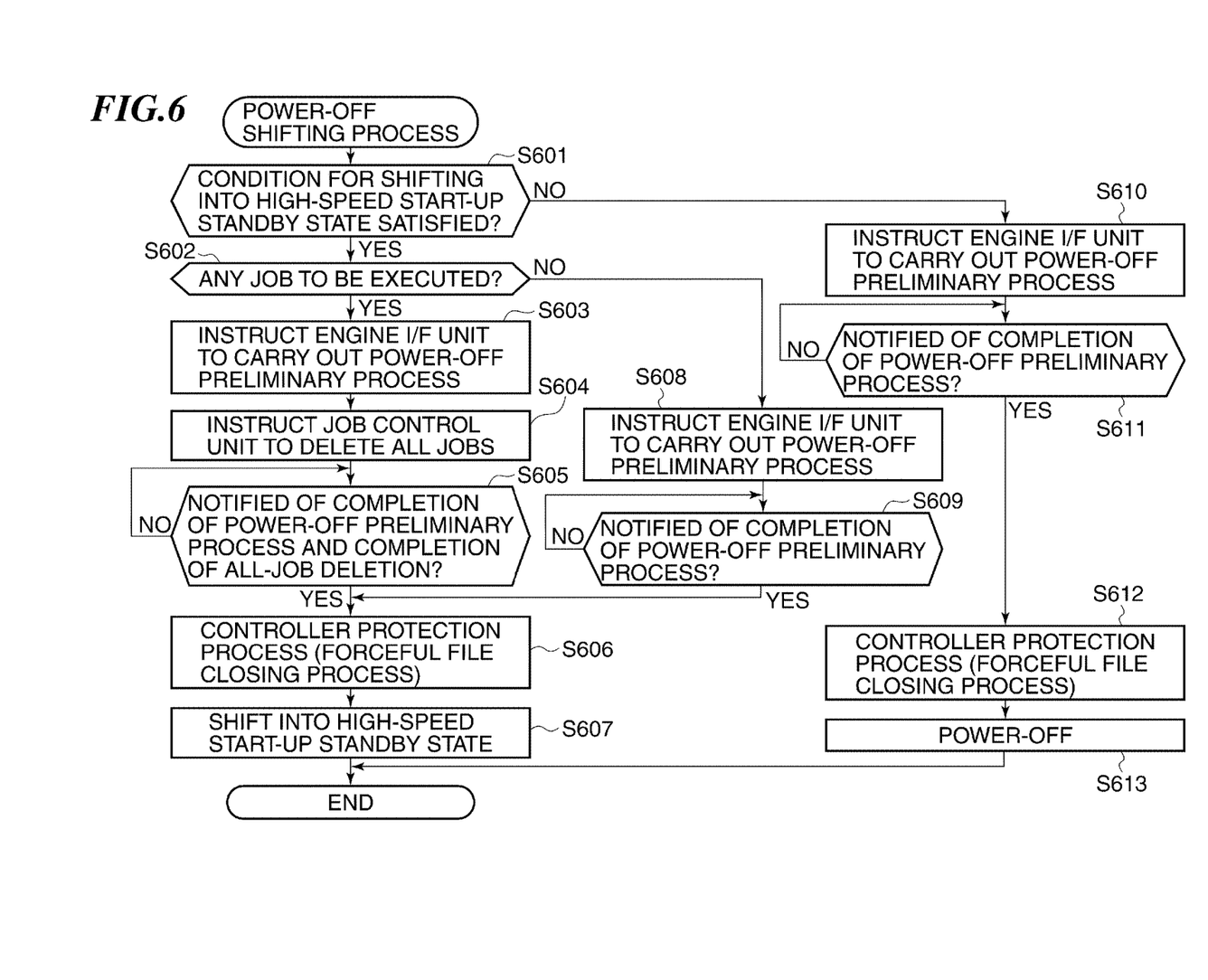
FIG. 6 is a flowchart showing the procedure of a power-off shifting process carried out by a CPU appearing in FIG. 2.

FIG. 6 is a flowchart showing the procedure of a power-off shifting process carried out by the CPU 301 appearing in FIG. 2.

The power-off shifting process in FIG. 6 is realized by the power-supply control unit 506 as a result of the CPU 301 executing the main program expanded on the RAM 340. This process is carried out when a power-off operation by the user is detected. Namely, this process is carried out when an instruction to reduce power consumption is detected. The instruction to reduce power consumption may be either an instruction to shift into the power-saving state or an instruction to shift into a state in which power to the entire image forming apparatus 101 is shut down (an instruction by a power-off operation). This image forming apparatus 101 has a timer power-off function of turning off power to at least a printer engine among hardware mechanisms after a predetermined time period has elapsed since the instruction to reduce power consumption was detected. As a result, when software falls into an unexpected state due to a bug of the like (for example, a state of being unable to leave a specific process), a situation where it is permanently impossible to shut down power to the printer engine can be circumvented.

The power-supply control unit 506 determines whether or not a condition for shifting into the high-speed start-up standby state is satisfied (step S601). Whether or not to shift into the high-speed start-up standby state is determined using a condition such as whether or not there has been a firmware update requiring reconfiguration of information stored in the RAM 340 has been done, or whether or not there has been a change in network settings requiring hardware resetting.

When, as a result of the determination in the step S601, the condition for shifting into the high-speed start-up standby state is satisfied (YES in the step S601), the power-supply control unit 506 determines whether or not there are jobs to be executed (step S602).

When, as a result of the determination in the step S602, there are jobs to be executed (YES in the step S602), the power-supply control unit 506 instructs the engine interface unit 509 to carry out a power-off preliminary process (step S603).

Further, the power-supply control unit 506 instructs the job control unit 505 to delete all the jobs to be executed (step S604).

The power-supply control unit 506 then determines whether or not it has been notified of completion of the power-off preliminary process and completion of the all-job deletion process (step S605). Here, the notification of completion of the power-off preliminary process is a response by the engine interface unit 509 to the power-off preliminary process in the step S603. The notification of completion of the all-job deletion process is a response by the job control unit 505 to the all-job deletion process in the step S604.

When the power-supply control unit 506 receives notification of completion of the power-off preliminary process and completion of the all-job deletion process (YES in the step S605), the process proceeds to step S606. The power-supply control unit 506 then forcefully closes a file system so as to complete writing of information that has not been completely written in the nonvolatile memory 303 and the hard disk device 204 as a protection process for the controller 202 (step S606).

Upon completing a protection process for the controller 202, the power-supply control unit 506 shifts into the high-speed start-up standby state (step S607) to prepare for the next power-on operation.

The process returns to the process in the step S602 described above, and when, as a result of the determination in the step S602, there are no jobs to be executed (NO in the step S602), the power-supply control unit 506 instructs the engine interface unit 509 to carry out a power-off preliminary process (step S608).

When the power-supply control unit 506 receives notification of completion of the power-off preliminary process from the engine interface unit 509 (YES in the step S609), the process proceeds to the step S606.

The process returns to the step S601 described above, and when the power-supply control unit 506 determines in the step S601 that the condition for shifting into the high-speed start-up standby state is not satisfied (NO in the step S601), the process proceeds to step S610. Then, in order to shift into normal power-off, the power-supply control unit 506 instructs the engine interface unit 509 to carry out a power-off preliminary process (step S610).

When the power-supply control unit 506 receives notification of completion of the power-off preliminary process from the engine interface unit 509 (YES in the step S611), the power-supply control unit 506 carries out a controller protection process (step S612). Thereafter, the power-supply control unit 506 turns off power to the image forming apparatus 101 (step S613) and terminates the present process.

Figure 7:
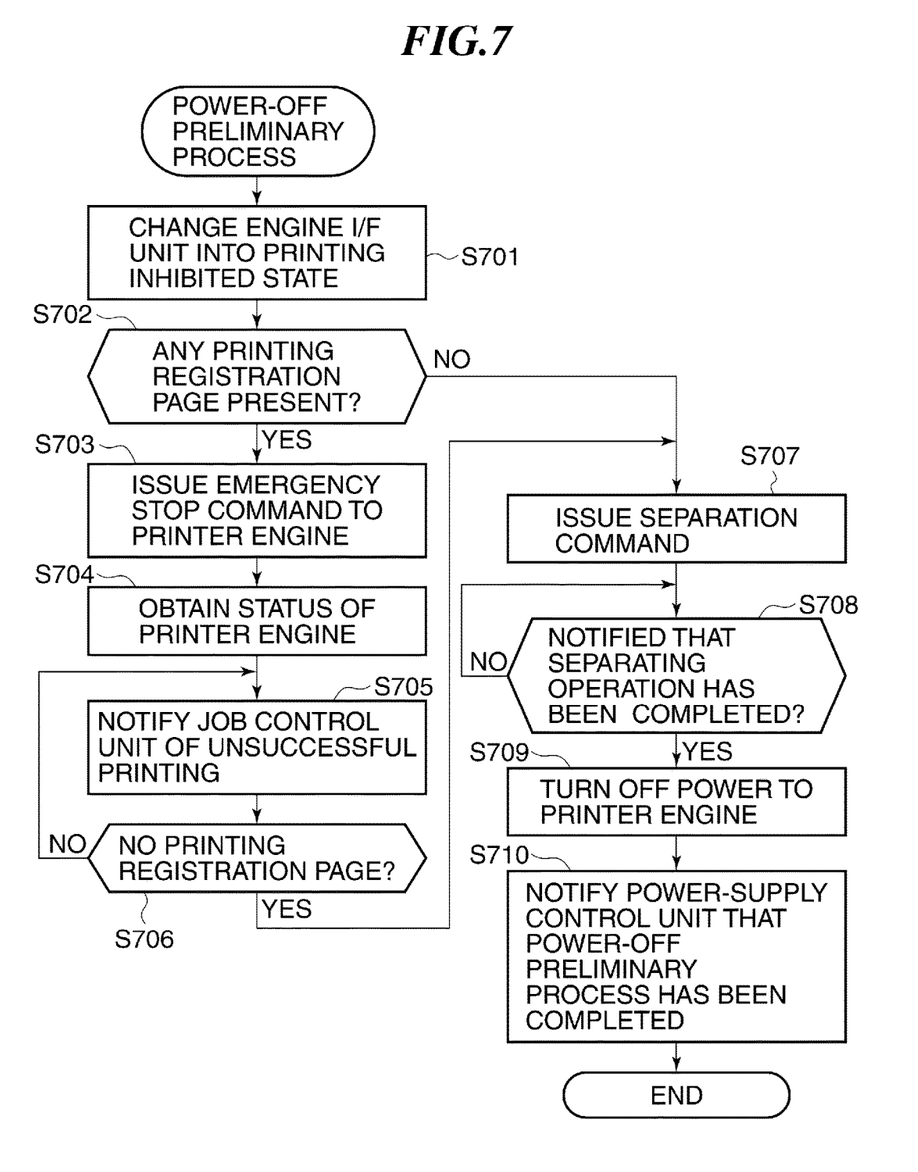
FIG. 7 is a flowchart showing the procedure of a power-off preliminary process carried out by the CPU appearing in FIG. 2.

FIG. 7 is a flowchart showing the procedure of a power-off preliminary process carried out by the CPU 301 appearing in FIG. 2.

The power-off preliminary process in FIG. 7 is realized by the engine interface unit 509 as a result of the CPU 301 executing the main program expanded on the RAM 340.

Referring to FIG. 7, the engine interface unit 509 changes its state to a printing inhibited state (step S701). As a result, even when a print request is received from the job control unit 505, the engine interface unit 509 sends back a message indicative of unsuccessful printing and does not send a new print command to the printer engine 205.

The engine interface unit 509 then determines whether or not there is a printing registration page managed by itself and already registered as a printing request (step S702).

When, as a result of the determination in the step S702, there is no printing respiration page (NO in the step S702), the engine interface unit 509 issues a separation command to the printer engine 205 (step S707).

In response to this, the printer engine 205 carries out the separating operation described earlier with reference to FIG. 3, and when the separating operation for all is completed, the printer engine 205 notifies the engine interface unit 509 that the separating operation has been completed.

Upon receiving notification of completion of the separating operation from the printer engine 205 (YES in step S708), the engine interface unit 509 turns off power to the printer engine 205 (step S709). Finally, the engine interface unit 509 notifies the power-supply control unit 506 that the power-off preliminary process by the engine interface unit 509 has been completed (step S710) and terminates the present process.

The process returns to the step S702 described above, and when, as a result of the determination in the step S702, there is a printing registration page (YES in the step S702), the engine interface unit 509 issues an emergency stop command to the printer engine 205 (step S703).

In a case where there is a sheet being conveyed when the printer engine 205 receives the emergency stop command, the printer engine 205 stops all drive motors in the apparatus so as to stop the conveyance of the sheet.

The engine interface unit 509 obtains a status of the printer engine 205 after issuing the emergency stop command (step S704). For example, a sheet jam occurs due to emergency stop, the engine interface unit 509 notifies the operation unit interface unit 502 of a sheet jam status via the job control unit 505.

At the same time, the engine interface unit 509 notifies the job control unit 505 of unsuccessful printing with respect to each of pages registered as printing registration pages.

When there is no printing registration page already registered as a printing request (YES in the step S706), the process proceeds to the step S707.

In the process described above, an emergency stop instruction (suspending instruction) for canceling a present process being under way and a planned process planned to be carried out is issued to the printer engine 205. Discarding of the present process is, for example, a process in which, when there is a sheet being conveyed as described above, all drive motors in the apparatus are stopped so as to stop conveyance of the sheet (a stopping process or a suspending process). The planned process is, for example, a process in which each of pages registered as printing registration pages is printed (a stopping process or a suspending process).

Further, in the step S707, when the present process and the planned process are canceled in response to the issued emergency stop instruction, an engine protecting instruction for causing the printer engine 205 to carry out a process determined in advance is issued.

In step S709, power supply to the printer engine 205 is shut down after the process determined in advance is carried out in response to the engine protecting instruction.

According to the processes in FIGS. 6 and 7, when an instruction to reduce power consumption is detected, the printer engine 205 is caused to discard a present process being under way and a planned process planned to be carried out (step S703). When the present process and the planned process are canceled, an engine protecting instruction for causing the printer engine 205 to carry out a separation process is issued (step S707). After the separation process is carried out in response to the engine protecting instruction, power to the printer engine 205 is shut down (step S709). As a result, the time required for a start-up process can be reduced.

Figure 8:
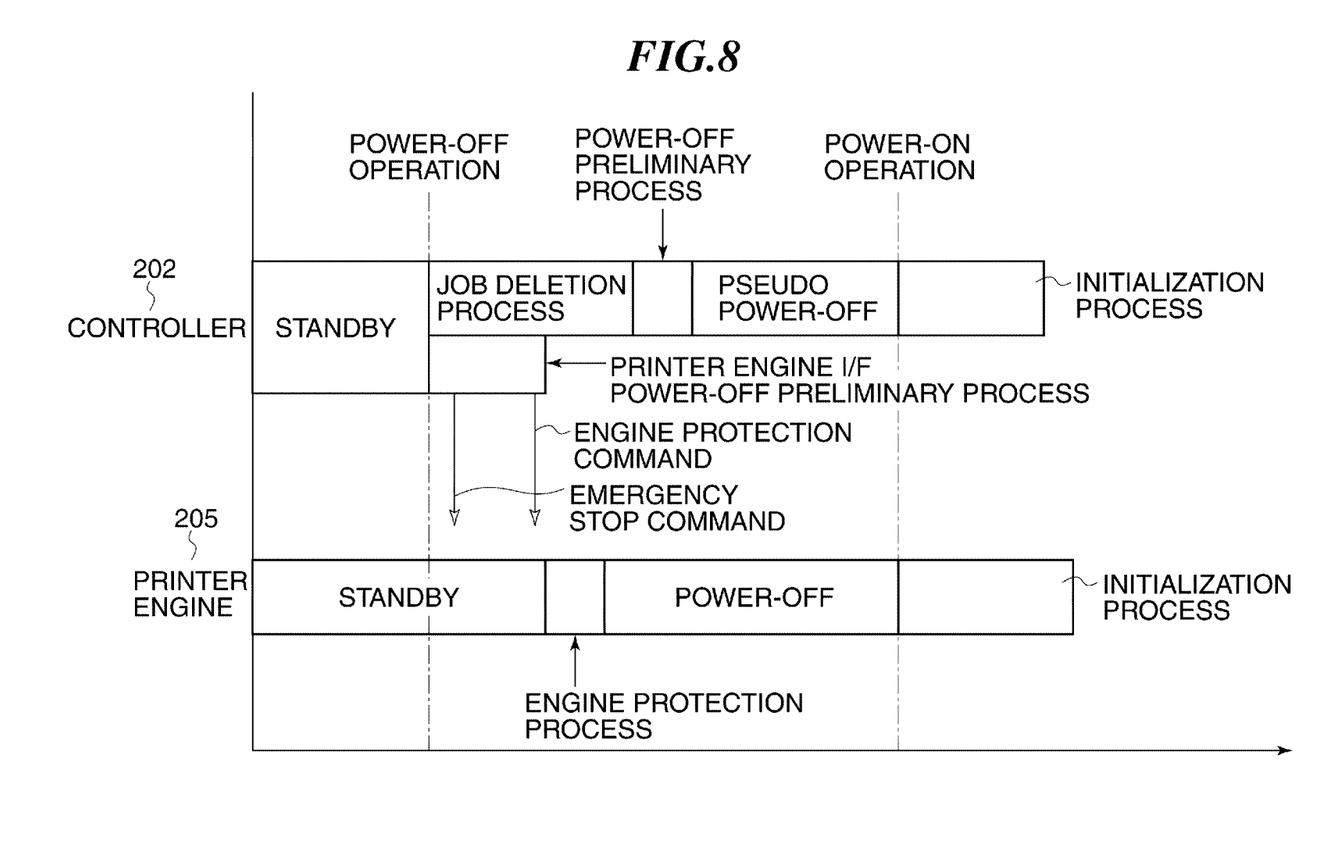
FIG. 8 is a diagram showing timing charts of the power-off shifting process in FIG. 6 and the power-off preliminary process in FIG. 7.

FIG. 8 is a diagram showing timing charts of the power-off shifting process appearing in FIG. 6 and the power-off preliminary process appearing in FIG. 7.

Referring to FIG. 8, when a power-off operation is performed, an emergency stop command in the step S703 is issued, and a separation command (engine protection command) in the step S707 is issued. As a result, an engine protection process is carried out before time-out.

As a result, the time required for an initialization process at start-up later can be shortened as compared to the initialization processing time according to the prior art shown in FIG. 9.

As described above, when a power-off operation is performed in a state where there is a print job, the image forming apparatus according to the present invention issues an emergency stop command to the printer engine without waiting for deletion of the print job. As a result, separation of the separation mechanisms can be started more quickly and completed reliably before forceful power-off by the timer power-off function. This enables high-speed start-up in response to a power-off operation after shifting into the high-speed start-up standby state.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-235583 filed Oct. 25, 2012, which is hereby incorporated by reference herein in its entirety.

What is claimed is:

1. An image forming apparatus comprising:
a printer engine which forms an image on a sheet;
a storage which stores a print job for causing the printer engine to perform a print process;
an interface which receives an instruction to stop supplying power to the printer engine;
a controller which includes a processor and a memory, and, when the interface has received the predetermined instruction to stop supplying power to the printer engine, performs a deletion process for deleting the print job stored in the storage and transmits a predermined command to the printer engine without waiting for completion of the deletion process, wherein the printer engine performs a protection process for protecting the printer engine in accordance with receiving the predetermined command without waiting for completion of the deletion process; and a power controller which stops supplying power to the printer engine when the protection process is completed, and stops supplying power to the printer engine forcibly when a predetermined period has elapsed since the interface recieved the predetermined instruction to stop supplying power to the printer engine without waiting for completion of the deletion process.

2. The image forming apparatus according to claim 1, wherein the printer engine comprises a photosensitive drum and an intermediate transfer belt onto which an image is transferred from the photosensitive drum, and
in the protection process, the photosensitive drum and the intermediate transfer belt are relatively separated from each other.

3. The image forming apparatus according to claim 1, wherein the printer engine comprises a first fixing part and a second fixing part for fixing an image on a sheet, and
in the protection process, the first fixing part and the second fixing part are relatively separated from each other.

4. The image forming apparatus according to claim 1, wherein the instruction is a power save instruction for causing the image forming apparatus to shift into a power-saving state.

5. The image forming apparatus according to claim 1, wherein the instruction is a turn off instruction for turning off the image forming apparatus.

6. The image forming apparatus according to claim 1, wherein the print job to be deleted is an active job.

7. The image forming apparatus according to claim 1, wherein the deletion process and the protection process are performed in parallel.

8. The image forming apparatus according to claim 1, wherein the power controller stops supplying power to the printer engine in accordance with receiving a completion notification of the protection process.

9. The image forming apparatus according to claim 1, wherein the power controller is able to stop supplying power to the printer engine forcibly when the predetermined period has elapsed since the interface received the predetermined instruction while software executed by the controller is abnormal.

10. The image forming apparatus according to claim 1, wherein the power controller shifts a state of the image forming apparatus to a power-saving state based on the predetermined instruction.

11. The image forming apparatus according to claim 10, wherein the power-saving state is a suspended state or a hibernation state.

12. A method comprising:
forming, by a printer engine, an image on a sheet;
storing a print job for causing the printer engine to perform a print process;
receiving a predetermined instruction to stop supplying power to the printer engine;
when the predetermined instruction to stop supplying power to the printer engine has been received, performing a deletion process for deleting the stored print job and transmitting a predetermined command to the printer engine without waiting for completion of the deletion process;
performing a protection process for protecting the printer engine in accordance with receiving the predetermined command without waiting for completion of the deletion process;
stopping, when the protection process is completed, supply of power to the printer engine; and
stopping, when a predetermined period has elapsed since the predetermined instruction to stop supplying power to the printer engine was received, supply of power to the printer engine forcibly without waiting for completion of the deletion process.

13. An image forming apparatus comprising:
a printer engine which forms an image on a sheet;
a storage which stores a print job for causing the printer engine to perform a print process;
an interface which receives a predetermined instruction to stop supplying power to the printer engine;
a power controller which stops supplying power to the printer engine forcibly when a predetermined period has elapsed since the interface received the predetermined instruction to stop supplying power to the printer engine; and
a controller which includes a processor and a memory, and, when the interface has received the predetermined instruction to stop supplying power to the printer engine, performs a deletion process for deleting the print job stored in the storage and transmits a predetermined command to the printer engine without waiting for completion of the deletion process,
wherein the printer engine performs a protection process for protecting the printer engine in accordance with receiving the predetermined command.

14. The image forming apparatus according to claim 13, wherein the printer engine comprises a photosensitive drum and an intermediate transfer belt onto which an image is transferred from the photosensitive drum, and
in the protection process, the photosensitive drum and the intermediate transfer belt are relatively separated from each other.

15. The image forming apparatus according to claim 13, wherein the printer engine comprises a first fixing part and a second fixing part for fixing an image on a sheet, and
in the protection process, the first fixing part and the second fixing part are relatively separated from each other.

16. The image forming apparatus according to claim 13, wherein the predetermined instruction is a power save instruction for causing the image forming apparatus to shift into a power-saving state.

17. The image forming apparatus according to claim 13, wherein the predetermined instruction is a turn off instruction for turning off the image forming apparatus.

18. The image forming apparatus according to claim 13, wherein the printjob to be deleted is an active job.

19. The image forming apparatus according to claim 13, wherein the deletion process and the protection process are performed in parallel.

* * * * *